(12) United States Patent
Caloud

(10) Patent No.: US 6,885,871 B2
(45) Date of Patent: Apr. 26, 2005

(54) METHOD FOR THE ADDRESSING OF A MOBILE TERMINAL

(75) Inventor: Philippe Caloud, chemin de Buttit (FR)

(73) Assignee: Volubill, Montbonnot Saint-Martin (FR)

( * ) Notice: Subject to any disclaimer, the term of this patent is extended or adjusted under 35 U.S.C. 154(b) by 468 days.

(21) Appl. No.: 10/191,918

(22) Filed: Jul. 9, 2002

(65) Prior Publication Data

US 2003/0013467 A1 Jan. 16, 2003

(30) Foreign Application Priority Data

Jul. 13, 2001 (FR) .......................................... 01 09426

(51) Int. Cl.[7] .............................................. H04Q 7/20
(52) U.S. Cl. ................... 455/466; 455/551; 455/550.1; 455/560; 370/355; 370/349; 370/389; 370/395.52; 370/401; 709/238; 709/245
(58) Field of Search ................................ 455/466, 551, 455/550.1, 445, 426.1, 422, 435.1, 560, 561; 370/351–356, 338, 349, 389, 392, 395.2–395.3, 395.52, 400–401; 709/245, 227, 238

(56) References Cited

U.S. PATENT DOCUMENTS

| 5,708,655 A | * | 1/1998 | Toth et al. ................... 370/313 |
| 6,304,753 B1 | * | 10/2001 | Hartmaier ................... 455/413 |
| 6,484,211 B1 | * | 11/2002 | Turunen ..................... 709/245 |
| 6,519,242 B1 | * | 2/2003 | Emery et al. ................ 370/338 |
| 6,725,047 B1 | * | 4/2004 | Farley et al. ............. 455/456.3 |
| 2002/0105931 A1 | * | 8/2002 | Heinonen et al. ........... 370/338 |
| 2002/0154624 A1 | * | 10/2002 | Oishi et al. ................. 370/350 |
| 2004/0205233 A1 | * | 10/2004 | Dunk ......................... 709/238 |

FOREIGN PATENT DOCUMENTS

| WO | WO 00/04679 | 1/2000 |
| WO | WO 00/18155 | 3/2000 |
| WO | WO 01/72007 A1 | 9/2001 |

* cited by examiner

Primary Examiner—Lester G. Kincaid
Assistant Examiner—Marcos L. Torres
(74) Attorney, Agent, or Firm—Patterson, Thuente, Skaar & Christensen, P.A.

(57) ABSTRACT

A method for the addressing of a mobile terminal including existing capacities, the SIP protocol (126a), address translation, (126d), short messages (126b) and TCP (126c) are used implement a resolution server (119) capable of engaging in dialog with a caller set (101), a called mobile terminal (108) and a gateway (128) having to be parameterized to set up a connection between the coller set and the mobile telephone through the internet network (106). The resolution server accepts connection invitations according to the SIP protocol. These invitation are transmitted, after the resolution of the SIP address, at the mobile terminal in the form of a short message. The mobile terminal accepts or rejects the connection request. Ion the event acceptance, the mobile terminal makes a request for the allocation of communications means to the gateway. These allocated means re notified to the caller set through the resolution server.

15 Claims, 2 Drawing Sheets

METHOD FOR THE ADDRESSING OF A MOBILE TERMINAL

BACKGROUND OF THE INVENTION

1. Field of the Invention

An object of the present invention is a method for addressing a mobile telephone. The field of the invention is that of mobile telephony considered in combination with the Internet. It is an aim of the invention to enable the making of incoming calls, in data (DATA) mode, for GPRS and UMTS type mobile terminals. Another aim of the invention is to limit the possibilities of possible destructive attacks against mobile terminals visible from the public Internet. Yet another aim is to enable the user to check those applications and entities external to the network that may contact him or link up with him in data mode. Another aim again is to enable a link-up with a user not just on one terminal alone but also on a known list of terminals belonging to him.

2. Description of the Prior Art

In the prior art, in order to link up with a mobile telephone through the Internet, it should be possible to identify it by a comprehensive identifier known from the public Internet. The mobile terminal should also be known on the Internet, namely it should have an allocated public Internet address.

Current solutions simply use permanent public Internet addresses for the mobile terminals, i.e. permanently allocated addresses at the public Internet level, depending in practice on a fast deployment of version 6 of the Internet Protocol (IPV6). Indeed, the number of public addresses available in version 4 of the Internet protocol (IPV4) is increasingly limited. These addresses are allocated by three international offices known as RIR or "Regional Internet Registries". However, in practice, there remain few IPV4 addresses. Certainly, the number of them that remains is insufficient in comparison with the number of mobile telephones that will be connected in GPRS or UMTS mode.

It must be noted however that the deployment of IPV6 in the GPRS/UMTS structure will entail a major cost. The availability of this protocol is furthermore uncertain, especially in the terminals. Finally IPV6 provides only a low-level routing address solution. The problem of the symbolic identification of the user, and not of his terminals, and the problem of securing incoming connection requests, namely the problem of determining who can contact which terminal, still has to be resolved. There also remains the problem of the flexibility of the management of this securing process, namely whether the user can control third-party access to his terminals.

Despite the limits of IPV4, the number of users connected to the Internet has increased by means of network address translation (NAT) techniques. An Internet service provider (ISP) or a company may manage a set of private addresses in its own network, these addresses being allocated in any unspecified way to the active terminals of the network, since they are not visible from the public Internet. These private addresses are put into correspondence dynamically, by the NAT equipment, with a public address. Since only one set of public addresses, corresponding to the maximum number of terminals, can be active at one and the same time, it is then managed by the service provider or company.

The problem with this solution is that it is quite impossible to initialize a session, directed to a terminal on the private network, from the public Internet, since the public address that has been allocated to it is neither known nor (above all) published.

A possible solution to this problem of addressing, which is beginning to be deployed in fixed data networks, is to set up dynamic Domain Name Servers (DNS) to publish the association between a machine name in FQDN (Full Qualified Domain Name) form and its IP address, which may be possibly dynamic. This approach enables an "incoming" addressing of the terminal. Other approaches are more application-specific. These are, for example, instant messaging applications, in which a "customer" software program registers the terminals, and therefore the external public address that it has been dynamically allocated, with a server external to the private network.

These approaches have a certain number of drawbacks. In particular, they do not take account of the specific characteristics of the GPRS and UMTS mobile data networks.

Thus, the GPRS standard specifies that the terminal can be addressed in the "incoming" direction by the GGSN (Gateway GPRS Support Node), but this function will not be necessarily carried out in the first deployed versions of these devices. Indeed, unlike the terminals of the fixed networks, the mobile telephone may be available for given sessions without having any address allocated in the GPRS network. In this case, it is the GGSN that will contact the terminal and allocate the address, in a more general context, including QoS (Quality of Service) parameters, called the PDP (Packet Description Protocol) context, the PDP being any packet network protocol for which GPRS offers compatibility. It must be noted that this address allocation policy corresponds in practice to a choice of the operator with a dependence on the mechanisms implemented by the equipment suppliers.

The current solutions also have drawbacks such as:

in the case of IPV4 addresses, an inability to cover the requirements of the large-scale consumer market, it being known that there are not enough addresses available for the totality of the mobile terminals in use, in the case of IPV6 addresses, these solutions entail a full change in infrastructure, with practical deployment in a relatively distant future. It must also be noted that these two approaches provide for direct visibility of the terminals from the public Internet. A clear danger is that Denial of Service or DoS type attacks, namely cases of denial of service that could make the target terminals inoperative, dynamic DNS type solutions cover only a part of the needs of the mobile data networks: indeed, it is a fundamental assumption that it is a client software program at the terminals that registers itself with the external dynamic DNS server. If the terminal can be linked up with, but has no Internet address at the given point in time (this is so in the case of the management of dynamic addressing by GPRS), then it is not known to the DNS server even if it is possible, potentially, to link up with it, typically through its telephone number (MSISDN). What is needed therefore is a generic notification mechanism both at the public Internet and, potentially between the GGSN gateway and the terminal. It is needed at the public Internet to report that the terminals belonging to Mr. Dupont or having a number 336xxxxxxxx, must be contacted to open an interactive game session on the port P, and it is needed potentially between the GGSN gateway and the terminal, if this terminal is not capable in practice of initializing an incoming data connection to the terminal.

SUMMARY OF THE INVENTION

The invention results these problems by the association of a symbolic address with each mobile terminal. An electronic address of this kind is for example described in the SIP or Section Initiation Protocol. The SIP corresponds to the RFC 2543. In the invention, a station therefore sends out a request to set up a connection. Said request then comprises a symbolic address of a mobile terminal. This request is sent to an SIP address resolution server. This SIP server manages an association table between the SIP symbolic address and the identifiers of the mobile telephony network, namely either an MSISDN (Mobile Station ISDN Number) or an IMDSI (International Mobile Subscriber Identity) number. This identity is registered in the SIM (Subscriber Identification Module) card. The resolution server therefore determines the telephone number to which it must send an SMS or Short Message Service. This short message is sent in transparent mode, i.e. it will not be seen by the user, and it comprises data informing the mobile telephone that a remote station wishes to set up a call connection with it in data mode, for example through the Internet. However, it can also be sent in non-transparent mode, so that the user can be notified of a request for the opening of a session and be capable of validating it explicitly.

The SIM Toolkit (STK, SIM with extended capabilities) application, activated by the arrival of the SMS (and its possible validation by the user in interactivity process), then initiates a TCP session towards a specified port of the SIP resolution server. For reasons of flexibility and security, the IP address information and the information pertaining to the port number of the SIP server are sent in the SMS message, whose total contents are signed by the SIP server using a private key. This TCP session then enables the terminal to send a message by which the resolution server SIP can associate a public Internet address with the terminal.

Through the standard GPRS mechanisms, the creation of this outgoing session gives rise to the allocation of the PDP context and an IP address for the terminal. This address is a private address of the GPRS data network. The address conversion mechanism compliant with the NAT function ensures that, when the TCP/IP packets of the terminal reach the SIP resolution server, located on the public Internet side, their address IP has been translated into a public address that corresponds to the private address internal to the GPRS network of the terminal. Since the TCP/IP contains MSISDN/IMSI information, the resolution server may update the association table between the SIP symbolic address, the MSISDN/IMSI and the allocated public IP address.

The resolution server then sends out a message to the set that seeks to set up a call connection in data mode with the remote terminal. The set then recovers the public Internet address and can directly address the mobile terminal through an Internet connection by means of an Internet protocol, for example the FTP (File Transfer Protocol).

An object of the invention is a method for the addressing of a mobile terminal identified by a first symbolic address during which:

a request to set up a connection with the mobile terminal is sent from a caller set to a resolution server of the first address through a first network, in the resolution server of the first symbolic address, the first symbolic address is associated with an input of a resolution table recorded in a memory of the resolution server of the first address, a second address of the mobile terminal in a second network is extracted from the resolution table, an invitation message is sent from the resolution server of the first address to the mobile terminal through the second network, a request for the allocation of communications means is received, on a communications gateway, to set up a connection between the caller set and the mobile terminal through the communications gateway, a means allocation frame comprising a description of the allocated means is sent from the communications gateway to the resolution server of the first address through a third network, a frame comprising the result of the connection set-up request, comprising a description of the allocated means, is sent from the resolution server of the first address to the caller set through the first network, a call connection is set up between the caller set and the mobile terminal through the communications gateway, by using the allocated means.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DESCRIPTION

It may be recalled that, in the description, when an action is attributed to a microprocessor or to an instrument comprising a microprocessor, this action is performed by the microprocessor controlled by instruction codes recorded in a memory. It is also recalled that a bus is a set of tracks or wires comprising elements whose number is sufficient to convey address, data, command, clock-interruption and supply signals.

Figure 1:
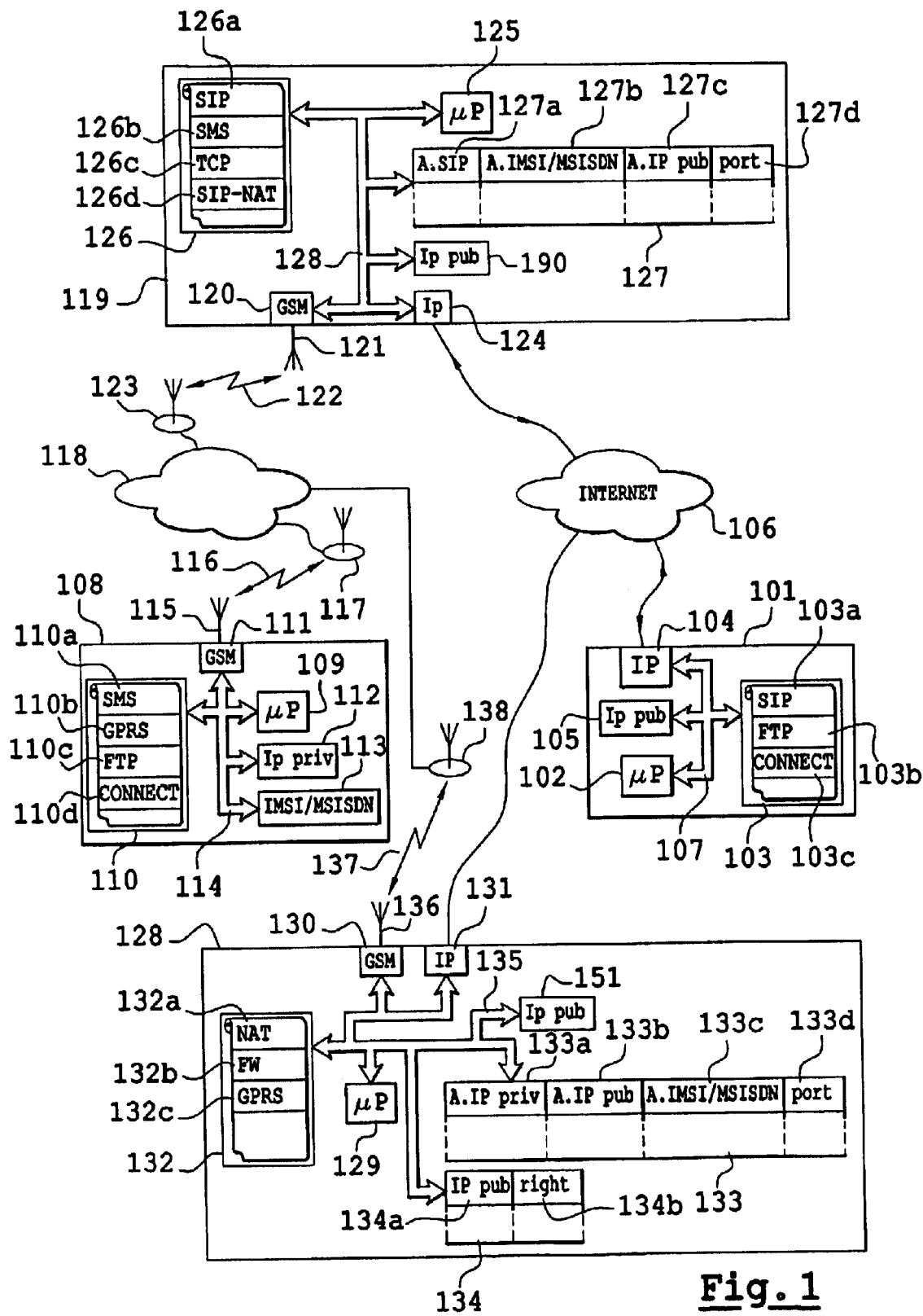
FIG. 1 illustrates means useful to the implementation of the method according to the invention.

FIG. 1 shows a caller set 101. The set 101 is, for example, a personal computer. The set 101 has a microprocessor 102, a program memory 103, interface circuits 104 for interfacing with an Internet network 106, and a memory 105 in which the public Internet address of the set 101 is recorded. The elements 102 to 105 are connected through a bus 107. The interface 104 connects the set 101 to the Internet network 106. The memory 103 has several zones, especially a zone 103A comprising instruction codes corresponding to the implementation of the SIP protocol, and a zone 103B comprising instruction codes corresponding to the implementation of the FTP protocol. In this example, it is assumed indeed that the set 101 wishes to establish a link in data mode, according to the FTP protocol, with a mobile terminal 108.

To set up this connection, the memory 103 has a zone 103C comprising the instruction codes that correspond to the setting up of this connection. The instruction codes of the zone 103C constitute a program that makes use of primitives, also called sub-programs, zones 103A and 103B. This means that, during the execution of the zone 103C, this zone makes use of primitives corresponding to the sending or reception of a frame according to the SIP or FTP protocols.

The public Internet address recorded in the memory 105 ensures that the set 101 can be seen from the public Internet.

FIG. 1 shows that the terminal 108 has a microprocessor 109, a program memory 110, interfacing circuits 111 for interfacing with a mobile telephony network, a memory 112 to record a private address, and a memory 113 to record an IMSI number and/or a telephone number. The elements 109 to 113 are connected together by a bus 114. The circuits 111 are furthermore connected to an antenna 115. This enables the sending and reception of radio signals 116 to or from a base station 117 of a cell telephony network 118.

The memory 110 has a zone 110A corresponding to instruction codes for the implementation of the short messages service. A zone 110B has instruction codes corresponding to the implementation of the GPRS mode. A zone 110C corresponds to instruction codes for the implementation of the FTP protocol. A zone 110D comprises instruction codes that correspond to the management of the connection requests according to the invention. These functions are, for example, available through a SIM Toolkit card comprising management primitives, SMS reception/dispatch primitives, GPRS connection primitives accessible from a program executed by the processor of the SIM card. Such a card communicates with the terminal 108 by known means.

In the present example, the circuits 111 correspond to the GSM standard which, when used in association with the GPRS instruction codes of the zone 110B, makes it possible to obtain a terminal 108 compatible with most of the protocols used on the Internet. However, in one variant of the invention, the circuits 111 may also work according to the UMTS standard for example. In this case, it is no longer necessary to implement the GPRS mode because the UMTS standard provides for this type of operation.

The memory 112 is used to register the address allocated to the terminal 108 when it makes an allocation request in a context known as the PDP context. For the terminal 108, this implies an activation of the operation in GPRS mode. The terminal 108 is then assigned an address recorded in the memory 112. This address is, for example, a private IPV4 address. It enables the identification of the terminal 108 in the GPRS network considered to be a private network as opposed to the Internet network which, for its part, is considered to be a public network.

FIG. 1 also shows an address resolution server 119. The SIP resolution server is connected to the network, for example, through a TCP/IP or X.25 connection to the SMSC (Short Message Service Center) server and, possibly, through SS7/TCAP/MAP for a connection to the HLR of the GSM network, enabling access to the information on presence. Indeed, it must be noted that there may be an interface between the SIP-NAT server and the HLR, by which it is possible to verify the state of the terminal and, if it is not attached to the GPRS network, to send back an error message stating "not contactable." FIG. 1 also shows GSM means 120 to 123 for the connection, in one variant, of the server 119 to the cell network 118. In practice, the connection means of the server 119 to the network 118 enable the exchange of SMS messages between the server 119 and the terminal 108.

The server 119 also has interface circuits 124 for interfacing with the Internet network 106. The server 119 also has a microprocessor 125, a program memory 126, and an association memory 127. The elements 120 and 124 to 127 are connected to each other by a bus 128.

The memory 126 has a zone 126A corresponding to instruction codes for the implementation of the SIP protocol. A zone 126B has instruction codes corresponding to the implementation of a short service message, a zone 126C corresponding to instruction codes for the implementation of the TCP (Transport Control Protocol) and a zone 126D corresponding to the implementation of a part of the method according to the invention. The instruction codes of the zone 126D make use of the instruction codes of the zones 126A, 126B and 126C.

The resolution memory 127 is also called a resolution table. Indeed, the memory 127 is structured in the form of rows and columns. A column 127A corresponds to a symbolic address according to the SIP protocol. A column 127B corresponds to an IMSI number and/or a telephone number. A column 127C corresponds to a public Internet address. A column 127D complements the column 127C in specifying a number of port numbers as defined by the IP protocol. Each row of the association memory 127 corresponds to the allocation of communications means through the Internet to a mobile terminal identified by the value of the column 127B. The table 127 thus enables an association to be set up between a symbolic address and a telephone number and an IMSI number.

The server 119 also has an address memory 150 to record a public Internet address through which the server 119 is visible on the Internet.

FIG. 1 also shows a communications gateway 128. The gateway 128 corresponds to a GGSN as defined in Xavier LAGRANGE, Philippe GODLEWSKI, and Sami TABANNE, *Réseau GSM* (GSM Network) 5th edition revised and supplemented, Hermès. The GGSN is described especially in chapter 14.3 of this work.

The gateway 128 has a microprocessor 129, interface circuits 130 for interfacing with the GSM network 118, interface circuits 131 for interfacing with the Internet network 106, a program memory 132, a memory 151 to register a public Internet address of the gateway 128, a communications means allocation memory 133, and an access control memory 134. The elements 129 to 134 are connected through a bus 135.

The memory 132 comprises a zone 132A corresponding to instruction codes for the implementation of an address translation program (NAT), the zone 132B comprises instruction codes corresponding to the implementation of a firewall program, a zone 132C comprises instruction codes corresponding to the management of the GPRS mode. The gateway 128 also comprises means to get connected and communicate with the cell network 118. These means are, for example, purely GSM means.

The memory 133 is structured as a table. The memory 133 has one column 133A corresponding to a private Internet address, a column 133B corresponding to a public Internet address, a column 133C corresponding to the IMSI number type identifier or telephone number and a column 133D corresponding to port numbers. The table 133 enables the association of the communications means with a mobile terminal identified by its IMSI number or its telephone number. These means are, firstly, a public Internet address visible from the public Internet, and secondly a private Internet address that can be used to identify the mobile terminal working in GPRS mode on the cell telephony network. These means are complemented, if necessary, by a list of ports to which the mobile terminal can send and/or receive through the communications gateway 128. These means are included in a PDP context.

The table 134 enables the firewall function of the gateway 128 to know which are the public address holders that are entitled to send out messages through the gateway 128. For example, the memory 128 has a column 134A corresponding to a public Internet address and a column 134B describing the rights associated with this address. These rights are, for example, a list of ports to which the holder of the public Internet address is entitled to send messages.

Figure 2:
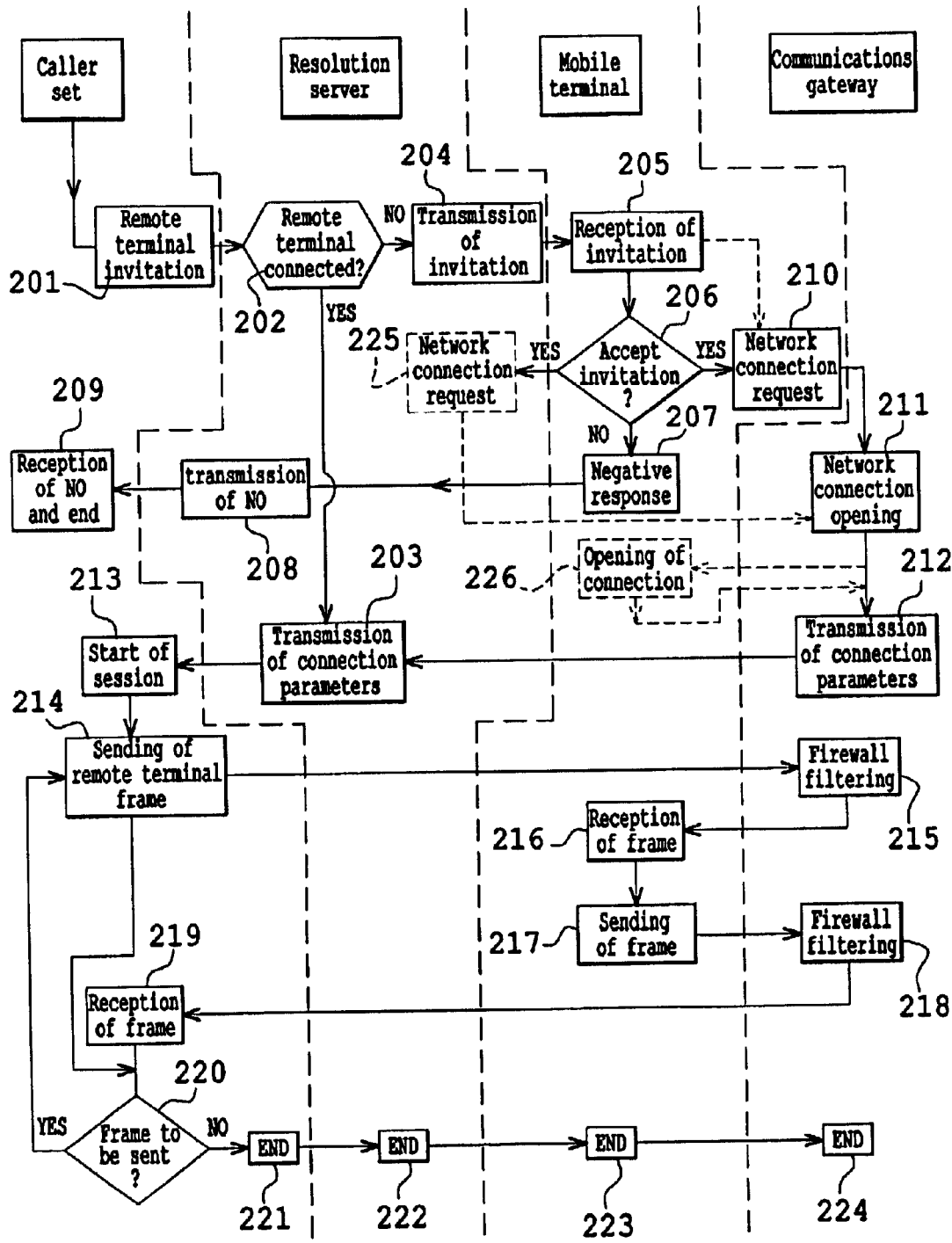
FIG. 2 illustrates steps of the method according to the invention.

FIG. 2 describes an implementation of the means that have just been described with FIG. 1.

FIG. 2 shows a preliminary step 201 executed by the caller set. The step 201 is a call connection initiation step. During the step 201, the post 101 uses the SIP protocol to send out a frame called an invitation frame in this protocol. A frame of this kind comprises a header and a message body. This header and this message body are defined in the RFC 2543. This invitation frame corresponds to a connection set-up request. The header of this frame therefore comprises an identifier code as an invitation frame, and a symbolic address of the mobile terminal with which the user of the set 101 wishes to set up the connection. The symbolic address is, for example, sip:terminal108@domaine-fr. The invitation frame also has parameters according to which the user of the set 101 wishes to set up the connection. In the present example, the object of these parameters is to set up a connection according to the FTP protocol. The object of these parameters could very well be the use of another protocol, for example the HTTP, or the setting up of a voice communication or a visioconference.

The invitation frame is sent to the resolution server 119 through the Internet 106. The set 101 therefore knows a public Internet address of the server 119, or a symbolic address of this server, for example www.serveur119.fr.

The next step is a step 202 for the reception by the resolution server 119 of a connection set-up request. In the step 202 the server 119 extracts the symbolic identifier of the mobile terminal with which the caller set wishes to set up connection from the connection set-up request. The server 119 then goes through the table 127 searching for this symbolic identifier, which is recorded in the column 127A. Once the symbolic identifier has been found, the server 119 is in a position to determine whether the terminal is or is not accessible through the Internet net 106. It determines this by consulting the field 127C corresponding to the symbolic address. If this field contains information, it means that the mobile terminal is already accessible through a public Internet address and the Internet network 106, and the operation then goes from the step 202 to a step 203 for the transmission of the connection parameters. If not, if the mobile terminal does not have any public Internet address, the operation goes to a step 204 for the transmission of the invitation to the mobile telephone.

In the step 204, the server 219 constitutes a short message or SMS. This short message is sent to the mobile terminal 108 whose telephone number is obtained by means of the value of the field 127B corresponding to the symbolic address contained in the connection set-up request. This short message comprises parameters of the connection that the set 101 wishes to make as well as an identifier of the user of the set 101. The operation passes to a step 205 for the reception of the invitation by the mobile terminal 108.

In the step 205, the short message invitation is read by the terminal 108. Then comes a step 206 for the acceptance or non-acceptance of the invitation.

In the step 206, the terminal 108 gives its user an invitation for setting up a connection. The user may then use a keyboard of the terminal 108 to decide whether or nor he wishes to accept the invitation. The invitation message is presented on a screen of the terminal 108 and comprises an identifier of the person wishing to set up the connection, and the parameters of the connection that this person wishes to set up. If the user rejects the connection, the operation passes to a step 207 where the terminal 108 composes a short message comprising an instruction code specifying the fact that the terminal 108 does not wish to accept the connection. The short message is then sent to the resolution server 119. The operation passes to the step 208 for the transmission of the refusal to set up the call connection.

In the step 208, the server 119 converts the short message of refusal into an SIP acknowledgement frame. This frame therefore comprises an instruction code which indicates the fact that the terminal 108 does not wish to set up the connection. This frame is transmitted to the caller set 101. The operation passes to the step 209 for the reception of a non-acknowledgement frame by the caller set.

In the step 209, the caller set receives the frame according to the SIP protocol, specifying that the mobile telephone does not wish to set up the connection. This brings the connection set-up procedure to an end.

If, in the step 206, the user chooses to accept the invitation, the operation passes to a net connection request step 210.

In the step 210, the terminal 108 sends the communications gateway 128 a means allocation request to set up a connection to the resolution server 119 through the Internet 106. This request is made as defined for example in the GPRS standard. This request comprises information on the identity of the set 101 as well as on the parameters of the connection that has to be set up. The information on identity is, for example, the MSISDN number of the set 101, the information on the connection parameters and the protocol that will be used to know the FTP protocol.

In one variant of the invention, the connection requests are considered to be systematically accepted by the terminal 108. The operation therefore passes directly from the step 205 to the step 210.

From the step 210, the invention passes to a step 211 for the allocation of communications means by the communications gateway 128. In the step 211, the gateway 128 receives the means allocation request sent out by the terminal 108. Following this request, the gateway 128 updates the table 133. This means that it assigns a pair of addresses constituted by a private Internet address and a public Internet address to a public identifier of the terminal 108, for example its IMSI number or its telephone number (MSISDN). The private Internet address is used to identify the terminal 108 on the GPRS network. The public Internet address is used to identify the terminal 108 on the public Internet network. The gateway 128 can also assign a port number for the connection that will be set up by the terminal 108. Thus, when the gateway 128 receives the message whose addressee is identified by an IP address and a port number, and when this IP address and this port number correspond to a public Internet address of the table 133, then the gateway 128 will redirect this message to the terminal whose identifier is present in the line comprising the public Internet address.

At the step 211, the gateway 128 also updates the table 134. Indeed, the means allocation request message comprises an identifier of the set 101. The gateway 128 therefore inserts a line into the table 134, and the public Internet address field of the table 134 will then correspond to the public Internet address of the set 101, and the field 134 will correspond to the port that has been allocated to set up a connection with the terminal 108. The gateway 128 is thus in a position to filter the messages addressed to the terminal 108 and thus avoid undesirable messages. All messages addressed to the gateway 128 by senders not registered in the table 134 are considered here to be undesirable. This is a standard firewall filtering technique. There are other techniques that are not described here.

With these communications means having been allocated, when the terminal 108 sends out a message to the communications gateway, it is sent with the allocated private Internet address. The gateway 128 then retransmits this message to the public Internet. On this public Internet network, this message will be seen as having been sent from the public Internet address allocated by the gateway 128. This is an address translation mechanism.

From the step 211, the operation passes to a step 212 for the transmission of the connection parameters allocated to the server 119. In this step 212, the gateway 128 constitutes a message, for example by using the TCP protocol, whose body comprises the allocated public Internet address, possibly the allocated port or ports and a public identifier of the terminal 108 (namely its IMSI number or its telephone number). The field identifying the sender of this message has the public Internet address which had been allocated as its value. This message is therefore actually sent by the terminal 108 to the server 119 through the Internet.

In one variant of the invention, in the step 206, when the user of the terminal 108 accepts the connection request, the operation passes to a connection request step 225, but this request is made by the server 119. When the invitation is accepted, the terminal 108 therefore sends a short acceptance message addressed to the server 119. This short acceptance message is received in the step 225.

In the step 225, the server 119 then sends a request, for example by using the FCP (Firewall Control Protocol defined by the IETF in a publication by Jiri Kuthan and Jonathan Rosenberg), to the gateway 128. This request comprises a field identifying the request as being a communications resources allocation request and a field identifying the terminal 108. This request is transmitted through the Internet network 106. The request is received by the gateway 128 and processed as in the step 211.

In this variant, the step 211 is followed by a connection-opening step 226 in which the terminal 108 receives messages sent by the gateway 128 to inform it about the allocation of the communications means. In this variant, it is therefore the gateway 128, and no longer the terminal 108, that takes the initiative. From the step 226, the operation goes to the step 212.

From the step 212, the operation goes to the step 203. In the step 203, the server 119 composes an acknowledgement message according to the SIP protocol. The body of this message comprises the public Internet address which had been allocated. The message is sent to the set 101 through the Internet network 106.

From the step 203, the operation goes to the session-starting step 213.

In the step 213, the set 101 has just received the parameters allocated by the gateway 128 for setting up a connection with the terminal 108. The set 101 therefore possesses the public Internet address through which it can contact the set 108. The operation then goes to a step 214 for sending a frame by the set 101. In the step 211, the set 101 forms a frame according to the FTP. The destination address of this frame is a public Internet address which had been allocated by the gateway 128. The Internet network will route this frame up the gateway 128. In the step 215, the gateway 128 receives the frame in the FTP format sent out by the set 101.

In the step 215, the gateway 128 extracts the frame sender's identifier from the frame that it has just received. If this identifier is present in the table 134, then this frame is transmitted earlier. If not it is rejected. In the present case, this identifier is present since the table 134 has been updated during the step 211. The operation passes to a step 216 for the reception of the frame by the mobile terminal 108. In the step 216, the terminal 108 receives a frame that has been sent out by the set 101. This frame then was first received by the gateway 128 and then sent out again by the same gateway in using the private address IPV4 allocated during the step 211. This private address corresponds, through the table 133, to the public address used by the set 101 to communicate with the terminal 108.

The operation passes to a step 217 in which the terminal 108 in turn sends a frame according to the FTP. The addressee of this frame is then the set 101 through its public Internet address. This frame is sent to the gateway 128 which receives it in the step 218. The gateway 218 then ascertains that the protocol used has been truly authorized by means of the table 133 and the identifier of the sender of this frame, namely the private Internet address of the terminal 108. This identifier makes it possible to verify the rights allocated to the terminal 108 in the table 133.

At the end of the step 218, the gateway 128 sends out a frame, originally sent out by the terminal 108, to the set 101. In this frame, the value of the field identifying the sender is the private Internet address that was allocated during the step 211 to the terminal 108. In the step 219 following the step 218, the terminal 108 receives the frame originally sent out by the terminal 108. The operation passes to a step 220 in which the set 101 determines whether it has received all the frames that it should have received or has sent all the frames that it should have sent. If it has not yet received or sent all the frames, the operation goes to the step 214. If not, the operation goes to a connection interruption step 221. In the step 221, the set 101 sends an SIP frame called BYE. This frame has an identifier of the terminal 108. The operation goes to the step 222 for the reception of the SIP frame BYE by the server 119.

In the step 222, the server 119 sends a short message to the mobile terminal informing it that the set 101 wishes to interrupt the call connection. This short interruption message is received by the mobile terminal 108 in the step 223. The server 119 also updates the table 127, i.e. it erases the fields 127c and 127d corresponding to the terminal 108.

During the step 223, the mobile terminal 108 sends one or more messages, according to the GPRS protocol, to the communications gateway 128. In the step 224 the gateway 128 receives these messages. In the step 224 the gateway 128 is therefore informed about the interruption of the call connection. The gateway 128 therefore updates the table 133 and 134. This amounts to the erasure, in the table 133, of the line corresponding to the terminal 108 and, in the table 134, of the line corresponding to the set 101.

In the invention, the call connections between the set 101 and the server 119 are made through the Internet network 106 by using the SIP protocol (this is the first network) defined in the RFC 2543. The call connections between the server 119 and the terminal 108 are made by using short messages as defined for example in the GSM standard (this is the second network). The call connections between the terminal 108 and the communications gateway 128 are made according to the GPRS (this is the third network). The call connections between the gateway 128 and the terminal 101 are made through the Internet network 106 according to a protocol specified during the allocation of the communications means. These protocols include the TCP, UDP, FTP, HTTP protocols, and there are many others.

The call connections between the gateway 128 and the server 119 are made through the Internet network 106 by using the TCP protocol or the FTP protocol (this is the third network).

Inasmuch as the Internet network is used for a certain number of call connections, it is possible to implement already existing encryption solutions. It is possible for example to use IP Secure in which the body of the Internet frames is encrypted so that their contents are accessible only to the addressee of the frame.

The advantages of the infrastructure according to the invention therefore are the following: this infrastructure provides an immediate resolution of the problem of incoming addressing in mobile telephones, and does so with existing equipment. This approach enables the speedy deployment of value-added services such as instantaneous messaging in all its multimedia versions, mobile office notification services etc. Furthermore, the standard protocols are used.

Inasmuch as the mobile telephone is not permanently visible from the public Internet network, and inasmuch as its public Internet address, when it exists, is not published, this limit the possibilities of destructive attack. Another advantage is that the embodiment enables the user of the terminal 108 to decide which connection request he is accepting and which connection request he is rejecting.

It may also be noted that, in one variant, where it is the terminal 108 that takes the initiative to link up with the gateway 128, there is no modification to be made to said gateway. Indeed, it is the terminal 108 that takes the initiative to send a message, through the Internet, to the server 119. This message is sent in a standard way to the IP address (that of the server 119) specified by the terminal. This message comprises the elements by which the server 119 can interpret this message as being a response of the terminal to the connection set-up request sent out by the set 101. In this case, the gateway 128 is only a known intermediary.

In the variant where the connection between the terminal 108 and the gateway 128 is open at the initiative of the gateway 128, following the reception of a message from the server 119, this connection is set up from an identifier of the terminal 108, preferably an IMSI number or MSISDN number. The result of the opening of the connection, especially the public address IP allocated to the terminal 108, is sent to the server 119. This transmission is done either by the terminal 109 or by the gateway 128. In this variant, the modifications to be made to the gateway are not important.

In one variant of the invention, it is also possible to use SIP frames known as option frames to specify the quality of the services and means which are allocated by the gateway 128. Among the factors of quality, we may refer to the passband, namely the bit rate, and the protocols that are usable. These options are then asked for by the unit 101 and accepted or degraded by the gateway 128 under the possible control of the terminal 108.

In the invention, it is the user of the terminal with whom a link is set up and not only a given terminal through his symbolic SIP address (for example, SIP:pierre.dupont@cegetel.fr). Thus, it is possible to associate several mobile terminals with the user and see to it that the SIP server 119 successively notifies all the associated terminals until the "active" terminal or the terminal sought to be active is found. The user can thus configure the access filters for achieving total control over the applications, sites or terminals external to the network which could contact its terminal.

In the invention, the SIP addresses may correspond to physical persons as well as to the service, for example of a technical back-up service of a company.

Through the invention, it is easy to set up sessions from the public Internet to mobile telephones at minimal cost by deploying high value-added services such as instantaneous messaging, multimedia services and the notification of mobile offices.

The implementation of the invention does not imply any complete leveling of the structure as would be the case for the IPV6. This implementation is furthermore compatible with the future deployment of IPV6 It uses only standard and existing protocols. The solution according to the invention can therefore be deployed immediately both at the infrastructural level and at the terminals. Furthermore, it is not necessary to modify the terminals because the solution can be added to the terminals through an SIM toolkit card for example.

The invention makes it possible to manage the dynamic allocation and the "de-allocation" of addresses through the use of local policies for the management of all the addresses at the level of the NAT function of the gateway 128, in enabling the applications to check this policy in the event of highly intermittent traffic etc.

The invention is also compatible with GPRS roaming (with possible changes of operators). This means that it enables the addressing of the active terminals in a visited mobile network that is a partner of the native network (namely the network to which the user of the terminal 108 belongs).

Similarly, the invention can be exploited in combination with a local traffic monitoring policy. For example, in the case of <<connectionless>> protocols such as the UDP, no session is set up at the transport level. A mean of knowing if a connection has to be left open may be to monitor, at the gateway 128, the traffic, and a "deactivation" procedure may be launched after a configurable time of inactivity. In this case, the gateway 128 has means to send out a "de-allocation" request to the server 119 which may then inform the set 101 that a closure of connection is in progress. The server 119 then sends a SIP message BYE to the set 101. If the set 101 responds by a SIP ACK message, the server 119 authorizes the gateway 128 to "de-allocate" the addresses as laid down in the step 224. If the set 101 responds with a new SIP <<Invite>> message, the server 119 does not authorize it.

A mobile terminal is, for example, a mobile telephone, a personal digital assistant (PDA) or more generally any device provided with means of communication through a data network.

What is claimed is:

1. A method for the addressing of a mobile terminal identified by a first symbolic address during which:

a request to set up a connection with the mobile terminal is sent from a caller set to a resolution server of the first address through a first network, in the resolution server of the first symbolic address, the first symbolic address is associated with an input of a resolution table recorded in a memory of the resolution server of the first address, a second address of the mobile terminal in a second network is extracted from the resolution table, an invitation message is sent from the resolution server of the first address to the mobile terminal through the second network, a request for the allocation of communications means is received, on a communications gateway, to set up a connection between the caller set and the mobile terminal through the communications gateway, a means allocation frame comprising a description of the allocated means is sent from the communications gateway to the resolution server of the first address through a third network, a frame comprising the result of the connection set-up request, comprising a description of the allocated means, is sent from the resolution server of the first address to the caller set through the first network, a call connection is set up between the caller set and the mobile terminal through the communications gateway, by using the allocated means.

2. A method according to claim 1, wherein the allocation request is sent out by the remote terminal through a fourth network.

3. A method according to claim 2, wherein the fourth network is a capable mobile telephony network supporting the GPRS.

4. A method according to claim 1, wherein the allocation request is sent out by the resolution server of the first symbolic address through the third network.

5. A method according to claim 4, wherein the allocation request is sent out (213) following the reception, by the resolution server of the first address, of an invitation acceptance message, the acceptance message being sent out by the mobile terminal.

6. A method according to claim 1, wherein the first network is the internet used in combination with the SIP protocol.

7. A method according to claim 1, wherein the second network is a mobile telephony network supporting short messages.

8. A method according to claim 1, wherein the third network is the Internet used in combination with one of the protocols of the group formed by TCP and and UDP and an FCP (Firewall Control Protocol) type applications protocol.

9. A method according to claim 1, wherein the connection set-up request comprises particulars of the caller set.

10. A method according to claim 1, wherein the allocated means comprise an address of the public Internet.

11. A method according to claim 1, wherein at the end of the connection call between the caller set and the mobile terminal, the allocated means are released.

12. A method according to claim 1, wherein the resolution server of the first address is identified by a public Internet address.

13. A method according to claim 1, wherein the communications gateway is identified by a public Internet address.

14. A method according to claim 1, wherein the allocation frame comprises a sender identifier, and the value of this identifier is a public Internet address included in the allocated means.

15. A method according to claim 1, wherein upon reception of an allocation frame, the resolution server of the first address updates the resolution table as a function of the allocated means.

* * * * *